INVENTOR.
WILLIAM C. RIESTER
BY E. Herbert Liss
ATTORNEY.

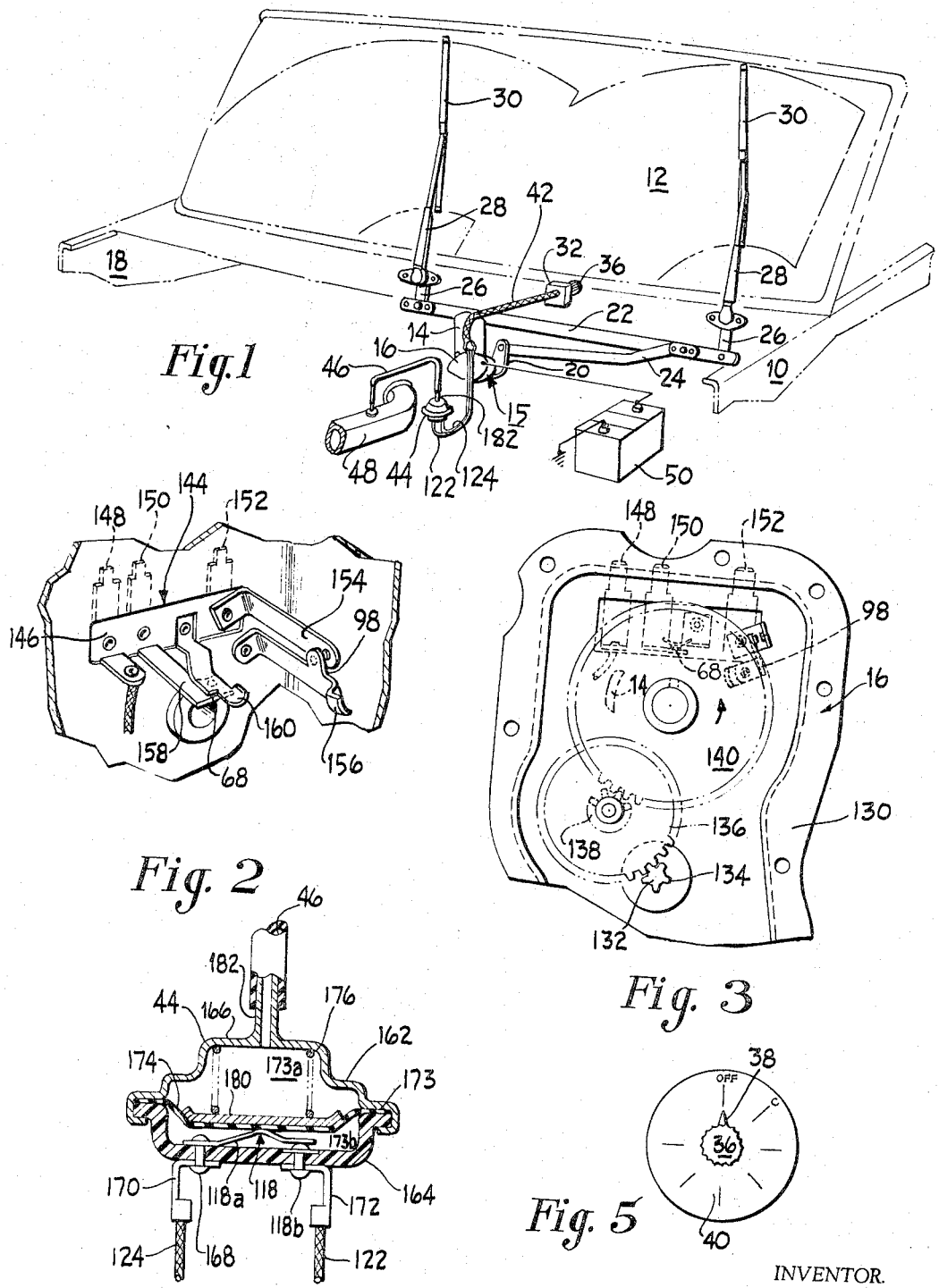

United States Patent Office 3,339,123
Patented Aug. 29, 1967

3,339,123
WINDSHIELD CLEANING SYSTEM FOR MOTOR VEHICLES
William C. Riester, Williamsville, N.Y., assignor to Trico Products Corporation, Buffalo, N.Y.
Filed Dec. 16, 1963, Ser. No. 330,739
9 Claims. (Cl. 318—443)

The present invention relates to a control system for motors and, more particularly, to a control system for windshield wiper motors which provide a dwell period between cycles of wiper operation.

Under certain road travel conditions such as in light or moderate rain, and on roads wet with the residue of rain where wheel spray from passing vehicles tends to partially obstruct vision, continuous wiper operation may cause smearing or wet film deposits created by the continuously moving blade. Furthermore, excessive wear of the wiper element results because of inadequate wetting of the windshield, necessary for proper lubrication. Another objectionable feature of conventional continuously operated windshield wipers is the driver fatigue induced by the constant back and forth movement of the wiper.

Intermittent dwell wiper systems wherein a dwell period is provided between cycles of wiper operation overcome the above-mentioned disadvantages of the present continuous wiper motion. During the dwell period the windstream against the windshield created by vehicle motion is used advantageously to dry and dissipate the thin film of vision obscuring moisture which is created by wiper operation on a wet-dry windshield. The dwell period provides discontinuity in wiper motion, avoiding monotony generated driver fatigue and frequency of wiper operation is reduced thereby prolonging blade life. The reduction in wiper frequency is accomplished while maintaining optimum wiper velocity as the wiper traverses its wiping path. With multispeed and variable speed continuous run wipers, change in wiper speed from the optimum speed can produce blade chattering and imperfect wiping.

Reliable intermittent dwell wiper systems have been developed which provide all of the advantages above mentioned. Such systems are illustrated in U.S. Patent No. 2,987,747 by J. R. Oishei et al., issued June 13, 1961, U.S. Patent No. 3,110,056 by J. R. Oishei et al., issued Nov. 12, 1963, and in U.S. Patent No. 3,117,335 by J. R. Oishei et al., issued Jan. 14, 1964.

The principal object of the present invention is to provide an improved control system for producing intermittent dwell windshield wiper operation utilizing a minimum number of control elements.

Another object of the invention is to provide an improved control system for producing intermittent dwell windshield wiper operation wherein the duration of the dwell period is controllable and consistent for any selected period within the operating range of the system.

A further object of the invention is to provide an improved control system for producing intermittent dwell windshield wiper operation which provides for continuous wiper operation as well as controllable dwell periods.

A still further and more specific object of the invention is to provide an improved intermittent dwell windshield wiper system for a motor vehicle utilizing a minimum number of elements including stable, static devices, wherein the duration of the dwell period is controllable to provide continuous wiper operation or intermittent dwell wiper operation with consistent, selected dwell periods and which provides continuous wiper operation for a controlled period automatically in response to vehicle acceleration.

Although the invention is particularly useful in connection with a motor vehicle windshield wiper system and is shown and described in such a system, it will of course be understood that the control system of this invention in accordance with the broader aspects thereof can be employed in any system where controllable intermittent motor output is desirable.

Other objects and advantages of the invention will be apparent from the following detailed description taken in connection with the accompanying drawings in which:

FIG. 1 is a partial perspective view of a motor vehicle embodying the instant invention;

FIG. 2 is a perspective view illustrating the contacts of the control system which are positioned with the gear reduction unit housing;

FIG. 3 is a partial elevational view of the gear reduction unit with the cover removed;

FIG. 4 is a longitudinal sectional view of the vacuum operated switch;

FIG. 5 is a front elevational view of the manual control and dial; and

Figure 6:
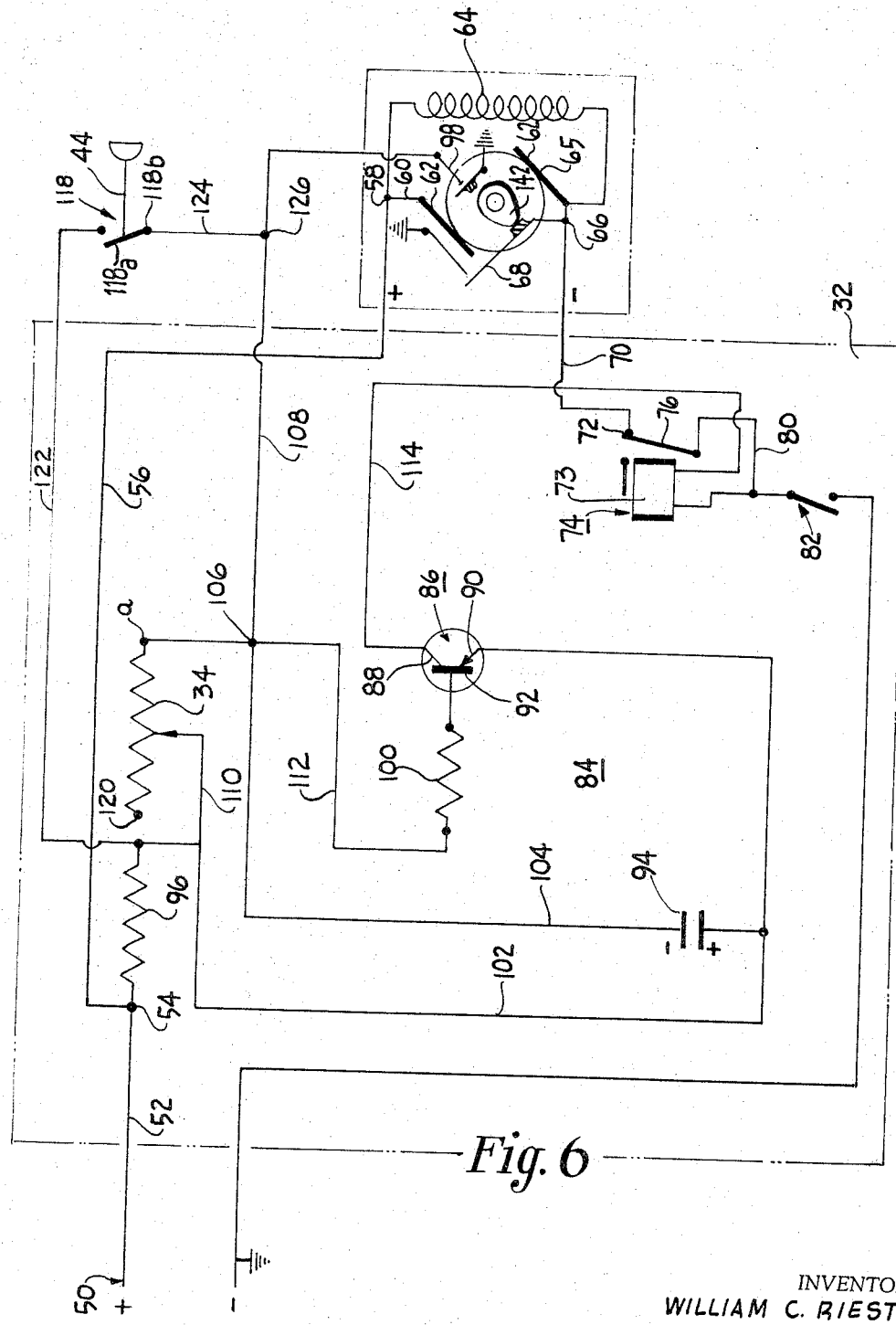
FIG. 6 is a schematic diagram showing the electrical system of the control system.

Briefly, the invention comprises a control system for a motor which drives a pair of windshield wiper blades through a gear reduction arrangement and a linkage system. The control system includes a relay having its contacts connected in parallel with the contacts of the parking switch in the supply line for the motor. The parking switch is internal and opens only when the motor is in such a position as to place the wiper blades in parked position. The relay is normally closed and actuated to open position by a timing network. The basic elements of the timing network comprise a pnp transistor connected in parallel with a selectively variable resistor which may be manually operated and a capacitor connected across a DC power supply through a normally open charging switch. The charging switch has its contacts positioned within the housing of the gear reduction unit and is actuated to closed position by a cam on the output gear of the gear reduction unit, which cam operates the charging switch and the parking switch sequentially once during each revolution. Closing of the charging switch effects charging of the capacitor and biases the base of the transistor negative with respect to the emitter. As the cam leaves the movable contactor of the charging switch, effecting opening thereof, the capacitor discharges through the variable resistor. Biasing the base negative with respect to the emitter causes current to flow in the emitter-collector circuit. The coil of the relay is connected in series in the emitter-collector circuit and is energized by current flow through this circuit. Energization of the coil effects opening of contacts in the supply line to the motor. However, the supply line remains closed by the parallel connected parking switch until the cam on the output gear of the gear reduction unit causes opening of the parking switch when the wiper blades are in the parked position. The duration of time during which the capacitor discharges is regulated by the value of the resistance in the variable resistor. Increase in the resistance increases the duration of time during which the capacitor is discharging. When the capacitor is discharged to a value insufficient to maintain the proper negative bias on the transistor base, emitter-collector current ceases, the relay contacts reclose, and the motor is restarted. This same cycle repeats itself when the motor again drives the cam on the output gear to cause closing of the charging switch. Setting the variable resistance to a very small or zero value results in rapid discharge of the capacitor causing closing of the relay contacts prior to opening of the parking switch, thereby resulting in continuous wiper operation.

To automatically effect continuous wiper operation during acceleration, a vacuum responsive switch having its contacts connected across the variable resistor is provided and may be responsive to manifold vacuum. During acceleration when the vacuum in the manifold line falls to a very low value, the contacts in the vacuum control switch close, shorting out the variable resistor thereby resulting in continuous wiper operation.

In FIG. 1 an automotive vehicle 10 is shown having a windshield 12 mounted thereon in a conventional manner. A windshield power unit 15 (indicated schematically in FIG. 6) including a wiper motor 14 and a gear reduction unit 16 is mounted on the fire wall 18 of the vehicle. The gear reduction unit has a crankarm 20 operatively coupled thereto. An elongated link 22 is pivotally secured to the crankarm 20 through a second elongated link 24. Opposite ends of the link 22 are connected to crankarms 26 mounted at the inner ends of rockshafts or pivot shafts (not shown), which pivot shafts are journaled in the cowl of the vehicle and have wiper arms 28 mounted at their outer ends. The wiper arms each carry wipers 30. When the wiper motor 14 is energized, the wipers 30 will be oscillated across the windshield to clear moisture therefrom. The gear reducer unit 16, crankarms 20 and 26, links 22 and 24 and the rockshafts constitute the wiper transmission means.

A control housing 32 containing the components indicated by broken lines in FIG. 6 is mounted on the inner side of the dash panel of the vehicle. A stem for controlling the movable contact of the variable resistor 34 projects outwardly toward the passenger compartment and has a knob 36 at the free end thereof. An indicating pointer 38 is provided which is movable with the stem and knob 36. A dial 40 graduated in dwell duration intervals is provided concentric with the stem on the outer side of the dash panel. A harness 42 of electrical conduit extends outwardly from the control housing 32 connecting the control system to the wiper power unit 15 and to the vacuum operated switch 44. A conduit 46 connects the vacuum operated switch 44 to the intake manifold 48 on the vehicle engine. The vacuum operated switch 44 may be mounted in any suitable location as, for example, on the fire wall 18 of the vehicle. The vehicle 10 is provided with a battery 50 which serves as a power supply. The negative terminal of the battery 50 may be grounded to a common ground system.

The motor 14 of the power unit 15 is connected across the power supply 50 through conductor 52, junction 54, conductor 56, junction 58, conductor 60, brushes 62 in parallel with field winding 64 through junction 66 and normally closed parking switch 68 to ground. From junction 66 the motor is alternatively connected to ground or negative side of the power supply through lead 70, stationary contact 72 of relay 74, movable contact 76 of relay 74, lead 80 and manual on-off switch 82 to the ground or negative terminal of the power supply. Thus it can be seen that the motor may be deenergized by opening manual switch 82 or by opening of the normally closed relay contacts 72, 76 when the cam actuated parking switch is opened.

The relay contacts 72, 76 of relay 74 are actuated to open position upon energization of coil 73 of relay 74. Coil 73 is energized through the timing network 84. The timing network 84 comprises a pnp transistor 86 having a collector 88, an emitter 90 and a base 92. The timing network 84 further includes the manually operated variable resistor 34 and a capacitor 94. The emitter-base circuit of the transistor 86, the capacitor 94 and the variable resistor are connected in parallel across the power supply through a current limiting resistor 96 and the charging switch 98. Connected in series with the base of the transistor 90 is a current limiting resistor 100 for protecting against over-current through the transistor.

The capacitor is connected across the power supply 50 through lead 52, junction 54, current limiting resistor 96, lead 102, capacitor 94, lead 104, junction 106, lead 108, charging switch 98 to ground. The manual variable resistor 34 is connected across the power supply through positive lead 52, junction 54, current limiting resistor 96, movable contactor 110, resistance 34, junction 106, lead 108 and charging switch 98 to ground. The emitter-base circuit of the transistor 90 is connected across the power supply through positive lead 52, resistor 96, lead 102, emitter 90, resistor 100, lead 112, junction 106, lead 108 and charging switch 98 to ground. The emitter-collector circuit of the transistor is connected across the power supply from positive lead 52, current limiting resistor 96, lead 102, emitter 90, collector 88, lead 114, coil 73 of relay 74 and switch 82 to the negative side of the power supply or ground. The vacuum operated switch 44 having contactor 118 comprising movable contact 118a and stationary contact 118b is connected across the resistor 34 from junction 120 through lead 122, contactor 118 and lead 124 to junction 126. It will thus be apparent that when the contactor 118 is closed, the resistance 34 is by-passed. The parking switch 68 and the charging switch 98 in the above described circuitry are operated by a cam on the output gear of the gear reduction unit 16.

The gear reduction unit 16 includes a housing 130 secured to the motor frame with the shaft 132 of the motor extending through the housing. The shaft 132 has formed thereon a spur gear 134 which meshes with idler gear 136. The idler gear 136 has mounted for rotation and concentric therewith a pinion 138 which meshes with the output gear 140 of the gear reduction unit. The unit gear 140 has formed thereon a cam 142. Secured to the housing 130 is a contactor assembly 144 including a terminal block 146 having terminals 148, 150 and 152 thereon. Terminal 152 is connected to ground through stationary contact 154 and movable contactor 156 which form the charging switch 98. Terminal 150 is connected to ground through stationary contact 158 and movable contactor 160 which form the parking switch 68. The movable contactors are positioned on a common arc and are engaged sequentially by the cam 142 as the output gear 140 is rotated counterclockwise thereby closing charging switch 98 and subsequently opening parking switch 68 after opening of charging switch 98.

The vacuum control switch 44 comprises a housing 162 having a base 164 of insulating material and a cover 166 which may be secured to the base or crimped thereto in any suitable manner. Movable contactor 118a is secured to the insulating base in any suitable manner as, for example, by a connecting rivet 168 as shown. Stationary contact 118b is secured to the base 164 in any suitable manner for engagement with movable contactor 118a. The conducting rivet 168 extends through the base 164 and has secured at its outer end a terminal 170 to which is secured lead 124. The stationary contact 118b extends through the base 164 to the outer side thereof and has secured at its outer end a terminal 172 to which is secured lead 122. The housing cover 166 and the base 164 form a closed chamber 173 divided by a diaphragm 174 having its peripheral edges interposed between annular flanges on the cover 166 and the base 164. The diaphragm divides the chamber 173 into a compartment 173a and a compartment 173b. A spring 176 is disposed in compartment 173a and extends between the upper surface of the cover 166 and a retaining plate 180 lying in juxtaposition with the diaphragm 174. A nipple 182 having a conduit therethrough leading to the compartment 173a is formed on the cover 166 and hose conduit 46 is secured thereto. Vacuum from the intake manifold 48 is admitted through hose 46 and nipple 182 to compartment 173a. The diaphragm is moved upwardly from a position seen in FIG. 4 against the bias of the spring 176 to permit normally closed contactor 118 to open. During the acceleration of the vehicle when the vacuum pressure of the intake manifold 48 drops and the pressure in the chamber 173 equalizes on opposite sides of the diaphragm, the spring 176 causes the diaphragm to move to the position seen in FIG. 4 thereby closing contactor 118.

The operation of the control system should now be apparent. When the knob 36 on the dash panel is turned to the continuous position indicated by C in FIG. 5 on the dial 40, the switch 82 is closed and the contactor 110 of the variable resistor 34 is at its end position A, thereby by-passing the resistor 34. The motor is then energized and causes rotation of the output gear 140 in counterclockwise direction as seen in FIG. 3. Continued rotation of the knob 36 introduces increasing segments of resistance 34, thereby increasing the duration of the dwell period. When the cam 142 engages the movable contactor 156 on the charging switch 98 the switch closes, placing the capacitor 94, the selected segment of resistance 34 and the emitter-base circuit of the transistor 86 across the power input. This causes the capacitor to become charged as indicated in FIG. 6 and biases the base negative with respect to the emitter. When the cam 142 leaves the contactor 156, the switch opens and the capacitor 94 discharges through the selected segment of resistance 34. The rate at which the capacitor discharges decreases with increasing resistance 34 so that continued clockwise rotation of knob 36 introduces more resistance and decreases the discharge rate of capacitor 94. As the discharge rate decreases, the base of the transistor 86 remains biased negative for a greater duration of time. When the base of the transistor is biased negative with respect to the emitter, the emitter-collector conducts thereby energizing coil 73 of relay 74, effecting opening of contactor 76. Contactor 76 remains open so long as the transistor emitter-collector circuit is conducting. When the cam 142 in continuing its clockwise rotation engages contactor 160, the parking switch 68 opens. Thus with contactor 76 and switch 68 opened, the input to the motor is interrupted and the motor stops. When the capacitor 94 has completed its discharge or has become discharged to such a low value of voltage as to effectively decrease the negative bias on the base of the transistor to cut off, the collector emitter circuit ceases to conduct and the contactor 76 closes, thereby restarting the motor.

If the vehicle is accelerated, the vacuum pressure in the intake manifold 48 drops causing spring 176 to bias diaphragm 174 downwardly closing contactor 118. Closing of contactor 118 results in by-passing of the resistor 34 and is tantamount to maintaining the pointer 38 at the position C of the dial. In other words, the resistor 34 is effectively removed from the timing network. Removal of the resistance 34 from the timing network permits the capacitor 94 to discharge so rapidly that the emitter-collector circuit of the transistor 86 ceases conduction before the parking switch 68 is opened by the cam 142; thus continuous operation results.

Since the load on the elements of the timing circuit is so small, the electrical characteristics do not vary through the range of the resistance 34 and the timing cycle remains precisely consistent. Thus at a given setting of the pointer 38 on the dial 40, there will be substantially no variation in the duration of dwell and, further, since the elements are lightly loaded and are inherently stable, there is no substantial wear on the timing circuit and long life of the control system can be expected. Although the relay 74 includes a moving contactor 76, the contactor 76 never opens a circuit, but only closes a circuit. Thus there can be no destructive arcing at the contacts and long and consistent life can be expected from this component.

It should now be apparent that a unique control system for intermittent dwell operation of a motor has been provided which is particularly suitable for intermittent dwell windshield wiper operation. A specific embodiment of the invention has been described for the purpose of illustration, but it will be apparent that various modifications and other embodiments are possible within the scope of the invention. For example, in accordance with the broader aspects of the invention, other and different physical constructions of the parking and charging switches may be employed, as well as other and different constructions of the vacuum operated switch. In accordance again with the broader aspects of the invention, a manually operated switch or a switch responsive to other and different conditions may be substituted for the vacuum operated switch. The variable resistor 34 may be selectively variable by means other than manual operation. Further, by employing certain obvious circuit modifications an npn transistor or other responsive bi-stable switching devices may be employed. The motor may be employed for other and different purposes. It is to be understood, therefore, that the invention is not limited to the specific arrangement shown, but in its broadest aspects it includes all equivalent embodiments and modifications which come within the scope of the invention.

What is claimed is:

1. In a windshield cleaning system for a motor vehicle including a set of windshield wipers and a motor operatively connected thereto for driving said wipers; a control system for said motor to provide controlled dwell periods between cycles of wiper operation comprising a timing network including input means and output means, a normally closed circuit interrupter opened when energized, actuated by said output means and having contacts connected in circuit with said motor, means for applying energy pulses to said input means, said timing network including means for converting energy pulses applied to said input means to output energy pulses of a controlled duration independent of the duration of the energy pulses applied to the input means and means for applying said output pulses to said circuit interrupter whereby said circuit interrupter is energized to effect opening of the motor circuit.

2. In a windshield cleaning system for a motor vehicle including a set of windshield wipers and a motor operatively connected thereto for driving said wipers; a control system for said motor to provide controlled dwell periods between cycles of wiper operation comprising a timing network, means for momentarily applying an input to said timing network in response to motor rotation and means for converting said momentary input to an output of controlled duration and frequency, a normally closed circuit interrupter actuated to open position when energized having contacts in circuit with said motor, and means for energizing said circuit interrupter from the output of said timing network.

3. In a windshield cleaning system for a motor vehicle including a set of windshield wipers and a motor operatively connected thereto for driving said wipers; a control system for said motor to provide controlled dwell periods between cycles of wiper operation comprising a timing network, means for momentarily applying an input to said timing network in response to motor rotation and means for converting said momentary input to an output of controlled duration and frequency, a normally closed circuit interrupter actuated to open position when energized having contacts in circuit with said motor, and means for energizing said circuit interrupter from the output of said timing network, normally closed switch means for by-passing said circuit interrupter contacts and means for opening said switch means at a selected wiper blade position.

4. In a windshield cleaning system for a motor vehicle including a set of windshield wipers and a motor operatively connected thereto for driving said wipers; a control system for said motor to provide controlled dwell periods between cycles of wiper operation comprising a timing network, means for momentarily applying an input to said timing network in response to motor rotation and means for converting said momentary input to an output of controlled duration and frequency, a normally closed circuit interrupter actuated to open position when energized having contacts in circuit with said motor, and means for energizing said circuit interrupter from the output of said timing network, normally closed switch means for by-passing said circuit interrupter contacts and means for opening said switch means at a selected wiper blade position and automatic means responsive to external conditions for reducing the duration of said timing network output pulse to a value sufficient to effect reclosing of said circuit interrupter prior to the opening of said normally closed switch means.

5. In a windshield cleaning system for a motor vehicle including a set of windshield wipers and a motor operatively connected thereto for driving said wipers; a control system for said motor to provide controlled dwell periods between cycles of wiper operation comprising a timing network including an energy storing device, impedance means for limiting the discharge rate of said energy storing device and a static switching device, switch means responsive to motor rotation for momentarily energizing said energy storing device and for biasing said static switching device to a conducting state, said static switching device being maintained in a conducting state during the discharge of said energy storing device, said energy storing device being connected in circuit with said impedance means, a normally closed circuit interrupter, open when energized having an actuating coil in circuit with said static switching device and being energized when said static switching device is in a conducting state and being deenergized when said static switching device is in a non-conducting state, said circuit interrupter having contacts in circuit with said motor.

6. In a windshield cleaning system for a motor vehicle including a set of windshield wipers and a motor operatively connected thereto for driving said wipers; a control system for said motor to provide controlled dwell periods between cycles of wiper operation comprising a timing network including an energy storing device, impedance means for limiting the discharge rate of said energy storing device and a static switching device, switch means responsive to motor rotation for momentarily energizing said energy storing device and for biasing said static switching device to a conducting state, said static switching device being maintained in a conducting state during the discharge of said energy storing device, said energy storing device being connected in circuit with said impedance means, a normally closed circuit interrupter, open when energized having an actuating coil in circuit with said static switching device and being energized when said static switching device is in a conducting state and being deenergized when said static switching device is in a non-conducting state, said circuit interrupter having contacts in circuit with said motor and control means for varying the value of said impedance to regulate the duration of the dwell period.

7. In a windshield cleaning system for a motor vehicle including a set of windshield wipers and a motor operatively connected thereto for driving said wipers; a control system for said motor to provide controlled dwell periods between cycles of wiper operation comprising a timing network including an energy storing device, impedance means for limiting the discharge rate of said energy storing device and a static switching device, switch means responsive to motor rotation for momentarily energizing said energy storing device and for biasing said static switching device to a conductive state, said static switching device being maintained in a conducting state during the discharge of said energy storing device, said energy storing device being connected in circuit with said impedance means, a normally closed circuit interrupter, open when energized having an actuating coil in circuit with said static switching device and being energized when said static switching device is in a conducting state and being deenergized when said static switching device is in a non-conducting state, said circuit interrupter having contacts in circuit with said motor and means for by-passing the impedance to produce continuous wiper cycling.

8. In a windshield cleaning system for a motor vehicle including a set of windshield wipers and a motor operatively connected thereto for driving said wipers; a control system for said motor to provide controlled dwell periods between cycles of wiper operation comprising a timing network including an energy storing device, impedance means for limiting the discharge rate of said energy storing device and a static switching device, switch means responsive to motor rotation for momentarily energizing said energy storing device and for biasing said static switching device to a conducting state, said static switching device being maintained in a conducting state during the discharge of said energy storing device, said energy storing device being connected in circuit with said impedance means, a normally closed circuit interrupter, open when energized having an actuating coil in circuit with said static switching device and being energized when said static switching device is in a conducting state and being deenergized when said static switching device is in a non-conducting state, said circuit interrupter having contacts in circuit with said motor and means responsive to vehicle acceleration for by-passing said impedance means to produce continuous wiper operation.

9. In a windshield cleaning system for a motor vehicle including a set of windshield wipers and a motor operatively connected thereto for driving said wipers; a control system for said motor to provide controlled dwell periods between cycles of wiper operation comprising a timing network including an energy storing device, impedance means for limiting the discharge rate of said energy storing device and a static switching device, switch means responsive to motor rotation for momentarily energizing said energy storing device and for biasing said static switching device to a conducting state, said static switching device being maintained in a conducting state during the discharge of said energy storing device, said energy storing device being connected in circuit with said impedance means, a normally closed circuit interrupter, open when energized having an actuating coil in circuit with said static switching device and being energized when said static switching device is in a conducting state and being deenergized when said static switching device is in a non-conducting state, said circuit interrupter having contacts in circuit with said motor and normally closed switch means by-passing said circuit interrupter contacts, said normally closed switch means being opened when said wipers are in parked position.

References Cited
UNITED STATES PATENTS 3,219,901  11/1965  Foreman et al. _____ 318—443
3,262,042  7/1966  Amos _____ 318—443

ORIS L. RADER, *Primary Examiner.*

J. C. BERENZWEIG, J. J. BAKER *Assistant Examiners.*